United States Patent [19]
Barozzi et al.

[11] 4,153,195
[45] May 8, 1979

[54] PROCESS FOR THE ATTENUATION OF ELECTRO-CORROSION IN COOLER ASSEMBLIES SOLDERED BY THERMAL BATH IMMERSION

[75] Inventors: Dan A. Barozzi; Valentin Călin, both of Brasov; Zsigmond Peter, Prejmer, all of Romania

[73] Assignee: Intreprinderea de Radiatoare Si Cabluri Brasov, Brasov, Romania

[21] Appl. No.: 918,398

[22] Filed: Jun. 23, 1978

Related U.S. Application Data

[63] Continuation-in-part of Ser. No. 771,000, Feb. 22, 1974, abandoned, which is a continuation-in-part of Ser. No. 612,806, Sep. 12, 1975, abandoned.

[51] Int. Cl.² .................................................. B23K 1/20
[52] U.S. Cl. .................................. 228/183; 228/206; 228/214; 204/129.75; 204/129.95
[58] Field of Search ............... 228/183, 203, 205, 206, 228/207, 214; 427/307, 327, 425; 204/129.75, 129.8, 129.95

[56] References Cited
U.S. PATENT DOCUMENTS

| | | | |
|---|---|---|---|
| 2,791,553 | 5/1957 | Connor et al. | 204/129.95 X |
| 2,916,402 | 12/1959 | Baird et al. | 427/435 X |
| 3,631,588 | 1/1972 | Barozzi et al. | 228/200 |
| 3,979,043 | 9/1976 | Lowery | 228/208 X |
| 4,037,774 | 7/1977 | Barozzi et al. | 228/183 |

*Primary Examiner*—C. W. Lanham
*Assistant Examiner*—K. J. Ramsey
*Attorney, Agent, or Firm*—Karl F. Ross

[57] ABSTRACT

A process for soldering aluminum fins to cooling pipes made of aluminum, copper, brass or steel to produce a cooling assembly. The fins are etched in the solution of sodium hydroxide, zinc chloride, technical urea and water and the cooling pipes are coated with a fusible alloy which is covered with a protective coating for attenuating electro-corrosion between the alloy and the aluminum fins. The aluminum fins are then mounted on the cooling pipes and soldered thereto in a thermal bath.

4 Claims, No Drawings

PROCESS FOR THE ATTENUATION OF ELECTRO-CORROSION IN COOLER ASSEMBLIES SOLDERED BY THERMAL BATH IMMERSION

CROSS REFERENCE TO RELATED APPLICATION

This application is a continuation-in-part of our co-pending application Ser. No. 771,000, filed Feb. 22, 1977, which in turn is a continuation of application Ser. No. 612,806, filed Sept. 12, 1975 (both now abandoned), and is related to U.S. Pat. No. 3,631,588.

FIELD OF THE INVENTION

The present invention relates, in general, to a process for the soldering of a cooler assembly and, more particularly, to a process for preventing electro-corrosion of a cooler assembly soldered by immersion in a thermal etching bath.

BACKGROUND OF THE INVENTION

In the process for soldering the cooling assembly, the cooling pipes, through which the cooling medium flows, are coated with a film of a fusible alloy prior to being fitted with the cooling fins, which are arranged on the pipes in an array. The assembly is then immersed in the thermal etching bath where the fusible alloy or solder melts, coating the surfaces of the elements of the assembly and fusing them together.

In practice, it has been found that when the cooling fins are made of aluminum prior to their arrangement on the cooling pipes they must be etched to remove any superficial oxide film which may have formed and then further treated to prevent oxidation and to create a solder-receptive surface.

As an example of the state of the art, the process as practiced by U.S. Pat. No. 3,631,588 etches the aluminum cooling fins for 1–5 minutes in a bath of 40% nitric acid at a concentration of 1.4 $g/cm^3$, 2% hydrogen fluoride at a 38% concentration, and 58% water, at a temperature of 20°–30° C. Following this treatment, the fin is further treated to provide a protective coating and create a solder-receptive surface by immersion for 30 seconds in a bath of 5–15% stearic acid, 2% ammonium bromide, and 83–93% technical grade alcohol.

Prior to being fitted with the fins, the cooling pipes are coated to a thickness of 0.04 mm with an easily fusible alloy layer of 46% Sn, 15% Cd, 15% Zn, and 23% Pb, or with two successive layers of an easily fusible soldering alloy, the first layer consists of 40% Sn and 60% Pb, while the second layer consists of 51% Sn, 16.2% Zn, 16.2% Cd, and 16.6% Pb.

In the case where the fins are made of copper, brass, or steel, the etching step is unnecessary and the entire cooling assembly is provided with a protective film prior to thermal etching by immersion in a bath of 20% stearic acid, 40% paraffin oil, 18% paraffin, 2% ammonium bromide and 20% diesel oil.

After the above treatments for the aluminum fins or the protective film for the entire assembly, the cooler is immersed for 5–10 minutes in the thermal etching bath consisting of 98% mineral oil and an etching mixture containing 60% stearic acid, 20% ammonium bromide, 10% glycerin, and 10% concentrated ammonia, the bath operating at a temperature between 260° and 300° C. which etches the cooler assembly and melts the fusible alloy coating on the cooling pipes thus effecting the soldering of the fins to the pipes. Subsequent to this operation, the soldering assembly is cooled with an air jet while held in a horizontal position and washed afterward with a suitable solvent.

The problem with the described process and other similar processes involving thermal etching baths for soldering, is the phenomenon of electro-corrosion, which takes place between the treated surfaces of the aluminum fins and the fusible alloy coating provided on the cooling pipes which the known processes do not prevent or even attenuate and which can ultimately cause leaks in the cooler assembly.

OBJECT OF THE INVENTION

It is therefore an object of the present invention to provide a process for soldering cooler assemblies which will attenuate electro-corrosion.

SUMMARY OF THE INVENTION

The process of the present invention is similar to that described above. Prior to the assembly of the cooler, the aluminum fins are etched to remove any oxides and then immersed in a bath for 30–60 seconds of ethylene trichloride with 10–30% stearic acid at a temperature of 30°–40° C., for the formation of oxide-preventing coating which is receptive to solder. At this point the process differs somewhat to provide for the attenuation of the electro-corrosion phenomenon by immersing the cooling pipes, which are made of copper, brass or steel, for 30–60 seconds in a bath of a mixture of ethylene trichloride with 10–20% stearic acid and a suspension of a metallic alloy suitable for soldering, the bath being at a temperature of 30°–40° C. and providing a coating for the pipes containing an easily fusible alloy and a protection against electro-corrosion. The elements of the cooler are then assembled and immersed for 20–120 seconds in a thermal etching bath of a mixture containing a 3% concentration of stearic acid for the soldering of the assembly.

SPECIFIC DESCRIPTION

In the process of the present invention, the aluminum cooling fins are stripped of any oxides by immersion for 10–30 seconds in a bath of 20–40% sodium hydroxide, 10% zinc chloride, and 5% urea, at a temperature of 40°–60° C., followed by washing, neutralizing and protecting by additional immersion in a bath of ethylene trichloride with 10% alcohol and 10% stearic acid. Alternatively, the aluminum fins may be immersed in a bath consisting of 25% stearic acid, 25% technical grade alcohol and 50% mineral oil. Unless otherwise indicated, all percents are by weight.

In order to attenuate the electro-corrosion which takes place between the aluminum surfaces of the fins and the tin-lead binary adhesion alloys applied to the cooling pipes, the pipes are immersed in a bath consisting of a mixture of 13% stearic acid, 13% alcohol of a concentration of 96%, 26% mineral oil and the balance a suspension of metallic alloy powder with a content of 75–90% Sn and 10–25% Zn, which provides an easily fusible alloy layer of 0.03–0.05 mm to the cooling pipes as well as a protective coating which attenuates the electro-corrosion.

EXAMPLE I

The surfaces of the aluminum cooling fins are treated for removal of oxides by immersion in a bath containing a solution of 20–40% sodium hydroxide (purity 99%), 10% anhydrous zinc chloride (purity 98-100%), 5% technical urea and the remainder of the solution water, for 10-30 seconds at a temperature of 40°-60° C.

After this pretreatment, the fins are washed by immersion in a bath of running water for 10-20 seconds after which they are neutralized by immersion in a bath of 0.5-1% hydrofluoric acid for a period of 10-20 seconds. Following this bath, the fins are immersed into warm water (75°-90° C.) for 10-20 seconds and then dried.

The solder-receptive protective coating is applied to the fins by immersing them in a bath of 10% stearic acid, 80% ethylene trichloride and 10% technical grade alcohol of 96% purity for 5-15 seconds. Alternatively, the fins can be treated in a bath of 25% stearic acid, 25% technical grade alcohol and 50% mineral oil. Either bath provides a coating on the aluminum surface of 2-4 microns.

The cooling pipes of copper, brass, steel or aluminum are coated thermally using known methods with a film of easily fusible alloy, either a binary alloy based on Sn and Pb or a quaternary alloy with or without a Sn base and having a minimum thickness between 0.03-0.05 mm.

For the attenuation of the electro-corrosion phenomenon, the cooling pipes are then immersed in a bath of 13% stearic acid, 13% technical alcohol of 96% concentration, 26% mineral oil and a 48% suspension of a metallic alloy powder formed of 87% Sn and 13% Zn.

The elements of the cooler are then assembled and immersed in the thermal etching bath consisting of 2% stearic acid and 98% mineral oil. The mineral oil has a flammability point minimum of 315° C., a viscosity at 100° C. of 45-65 c St and 5.98°-8.58° E, an organic acidity minimum of 0.10 KOH/g, a freezing point maximum of ∓10° C., a mechanical impurity maximum of 0.03% and no water. The cooling assembly is kept in this bath for 20-120 seconds at a temperature of 250°-300° C., during which time the fusible alloy melts and upon removal from the bath and cooling with an air jet, solidifies and solders the elements of the assembly together.

A complete cleaning of the soldered assembly is then provided by immersion in a bath of a suitable solvent, such as ethylene trichloride or its substitute.

EXAMPLE II

Copper, brass or steel fins in an unetched state are fitted onto cooling pipes of copper, brass or steel which has been coated with a thin layer of a binary soldering alloy of Sn and Pb and protected by immersion in a solution consisting of 10-20% technical stearic acid and 80-90% ethylene trichloride. The assembly thus treated is introduced for soldering into the thermal etching bath having the same composition as given in Example I. The assembly is kept in this medium for 20-120 seconds at a temperature between 250°-300° C., during which time the surfaces of the assembly are etched and the fusible alloy melts.

After removal of the assembly from the thermal bath, it is treated as in Example I.

We claim:

1. In a process for soldering aluminum fins to cooling pipes made of aluminum, copper, brass or steel to produce a cooling assembly wherein the aluminum fins are etched and provided with an oxide-preventing coating, wherein the cooling pipes are coated with a fusible alloy, and wherein the aluminum fins are then mounted upon and soldered to the cooling pipes in a thermal bath, the improvement wherein:

said aluminum fins are etched in a solution of sodium hydroxide, zinc chloride, technical urea and water; and said fusible alloy layer on said cooling pipes is covered with a protective coating for attenuating electro-corrosion between said alloy and said aluminum fins.

2. The improvement defined in claim 1 wherein:

said sodium hydroxide is present in said solution in an amount of 20 to 40% by weight at a purity of 99%;

said zinc chloride is present in said solution in an amount of 10% by weight at a purity of 98 to 100%; and said technical urea is present in said solution in an amount of 5% by weight.

3. The improvement defined in claim 1 wherein said protective coating is applied by immersing said cooling pipes in a solution comprising by weight 13% stearic acid, 13% technical alcohol at a concentration of 96%, 26% mineral oil and a suspension of metallic powder of an alloy comprising 75 to 90% tin and 10 to 25% zinc.

4. The improvement defined in claim 1 wherein:

said sodium hydroxide comprises 20 to 40% by weight of said solution, at a purity of 99%;

said zinc chloride comprises 10% by weight of said solution, at a purity of 98 to 100%;

said technical urea comprises 5% by weight of said solution; and said protective coating is applied by immersing said cooling pipes in a solution comprising 13% by weight stearic acid, 13% by weight technical alcohol at a concentration of 96%, 26% by weight mineral oil and a suspension of metallic powder of an alloy comprising by weight 75 to 90% tin and 10 to 25% zinc.

* * * * *